June 14, 1927.  W. BRADLEY  1,632,216

TRAVELING VALVE FOR OIL WELL PUMPS

Filed Aug. 10, 1926

INVENTOR.
William Bradley,
BY John M. Spellman
ATTORNEY.

Patented June 14, 1927.

1,632,216

UNITED STATES PATENT OFFICE.

WILLIAM BRADLEY, OF THRIFT, TEXAS.

TRAVELING VALVE FOR OIL-WELL PUMPS.

Application filed August 10, 1926. Serial No. 128,362.

This invention relates to improvements in pumps, particularly for oil wells and one of the primary objects thereof is to provide a traveling valve, including means for preventing sand from interfering with the working parts of the valve.

Another particular object of the invention is its simplicity, there being few parts liable to become inoperative, the valve, however, capable of performing the same service as those traveling valves of complicated and numerous parts.

The invention will be better understood from a perusal of the following detailed description, in connection with the accompanying drawings and wherein—

Figure 1:
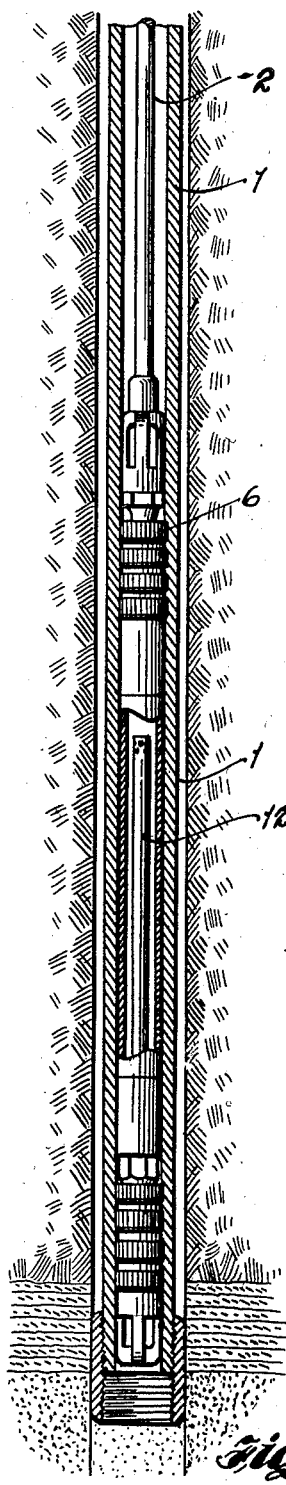
Figure 1 is a longitudinal sectional view of a pump barrel and illustrating an embodiment therein of the traveling valve.
Figure 2:
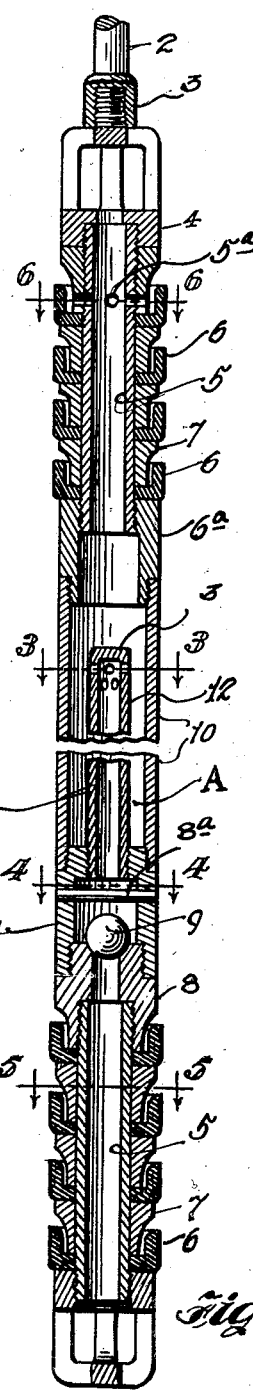
Figure 2 is an enlarged, horizontal sectional view of the valve removed from the barrel.
Figure 3:
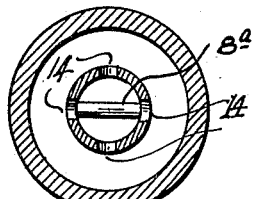
Figures 3 to 6 are cross-sectional views taken along the lines indicated by the numerals corresponding to the several views.
Figure 4:
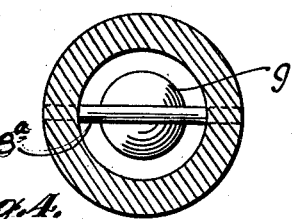
Figure 5:
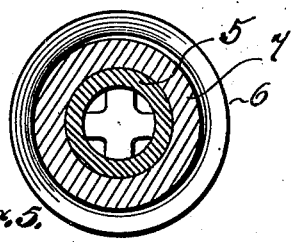
Figure 6:
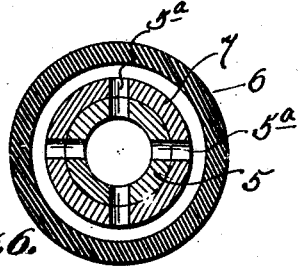

Proceeding in accordance with the drawings and wherein similar numerals indicate the various parts, 1 denotes a pump barrel and 2 a sucker rod connecting the traveling valve to a source of power such as a walking beam or the like. The sucker rod is connected to the head of the valve at 3 as in ordinary practice.

The traveling valve comprising the invention consists of a connecting head 4 and an upper tubular member 5. Spaced around the latter are several cups 6 separated by spacer rings 7, seated upon the cups 6 in the well known manner. An upper connecting head is shown at $6^a$.

The lower part of the valve is constructed in a manner similar to its upper part, except that it includes a lower connecting head 8 which forms a seat for a ball 9 held in close proximity to its seat by a pin $8^a$.

Connected to the upper head $6^a$ is a tube 10 which forms a more prominent part of the invention. The lower end of this tube is connected to a member 11, and the lower connecting head 8 forms a connection with the member 11, approximately completing the assembly of the valve.

Interiorly of the tube 10 and connected centrally of one end of the coupling member 11 is a large nipple 12 which forms a very particular part of the invention. This nipple is closed at its upper end 13. It will be noticed that this end of the nipple is spaced well below the upper head $6^a$ and adjacent the end are perforations 14. These perforations enable the liquid entering through the lower tubular member 5 and through the port $8^a$ in the head 8 to pass from the nipple in a horizontal fashion, and which permits any sand in the oil to fall into the trap. This trap is formed around the nipple and the upper end of the member 11 forms a seat therefor.

The interior diameter of the head $6^a$ is sufficiently large to permit the oil to expand its volume prior to its entrance into the upper tubular member 5. This latter member is perforated at $5^a$ for the purpose of allowing any fine sand to escape.

In operation on the downward stroke of the valve the oil unseats the ball 9 and passes through the nipple 12 into the tube 10, and strikes the walls thereof. When the valve rises on the upward stroke, the ball is forced into its seat. Any sand will, on account of its directional entrance into the tube 10, begin to fall into the trap A before the next upward movement of the valve.

I claim—

A traveling valve for oil well pumps comprising a central tube, upper and lower connecting heads, said heads including a tubular element, a plurality of cups above and below said central tube carried by said heads, a perforated nipple seated within the central tube; a coupling member interposed between the lower head and lower end of said central tube and including a port, a ball having its upward movement limited by a fixed transverse pin carried by said coupling and having its seat in said lower connecting head, said nipple supported by and communicating with said coupling, whereby said coupling, nipple and walls of said central tube form a sand collecting means, said tubular elements also being substantially similar in construction to each other, said cups having spacer rings interposed therebetween and the upper tubular element being perforated adjacent the uppermost of the cups for the purpose of allowing fine sand to escape.

In testimony whereof I affix my signature.

WILLIAM BRADLEY.